Dec. 20, 1955 B. HOWARD 2,727,944

TELEGRAPH PRINTER

Filed Feb. 26, 1953 3 Sheets-Sheet 1

INVENTOR
BERNARD HOWARD
BY James and Franklin
ATTORNEY

Dec. 20, 1955 B. HOWARD 2,727,944

TELEGRAPH PRINTER

Filed Feb. 26, 1953 3 Sheets-Sheet 2

INVENTOR
BERNARD HOWARD
BY James and Franklin
ATTORNEY

| | 1 | 2 | 3 | 4 | 5 | 6 | 7 | 8 |
|---|---|---|---|---|---|---|---|---|
| 0° | | T | | O | | H | N | M |
| 45° | | L | R | G | I | P | C | V |
| 90° | E | Z | D | B | S | Y | F | X |
| 135° | A | W | J | | U | Q | K | |
| 180° | | 5 | | 9 | | £ | , | . |
| 225° | | ) | 4 | & | 8 | O | : | ; |
| 270° | 3 | " | $ | ? | | 6 | ! | / |
| 315° | − | 2 | ' | | 7 | 1 | ( | |

INVENTOR
BERNARD HOWARD
BY James and Franklin
ATTORNEY

United States Patent Office 2,727,944

Patented Dec. 20, 1955

2,727,944

TELEGRAPH PRINTER

Bernard Howard, Ramsey, N. J., assignor, by mesne assignments, to Teleprinter Corporation, Hackensack, N. J., a corporation of New Jersey Application February 26, 1953, Serial No. 339,119

13 Claims. (Cl. 178—35)

This invention relates to communications apparatus, and more particularly to printers which operate in response to coded or telegraph signals.

The primary object of the present invention is generally to improve such telegraph printers, typically those working from a five level or five unit code, usually though not necessarily obtained from a perforated tape. Further objects are to provide a telegraph printer which is less expensive, much smaller, and lighter in weight than the conventional telegraph printer. It is also made of fewer parts which are easier to assemble and easier to service than is the case with the usual telegraph printer.

A more specific object is to provide for type selection by means of a cable or other flexible strand acted on by multiple pulleys, each of which may be moved to either of two positions. The motion of a second pulley is double that of a first, and so on, thereby providing different positions of the cable and consequent selection of type. In accordance with a further feature and object of the invention the type selection may be made either longitudinal, or rotary, and preferably both, thereby providing a type cylinder carrying a large number of characters, without requiring excessive motion in one direction for selection of a desired character.

To accomplish the foregoing general objects, and other more specific objects which will hereinafter appear, my invention resides in the telegraph printer elements, and their relation one to another, as are hereinafter more particularly described in the following specification. The specification is accompanied by drawings, in which.

Figure 1:
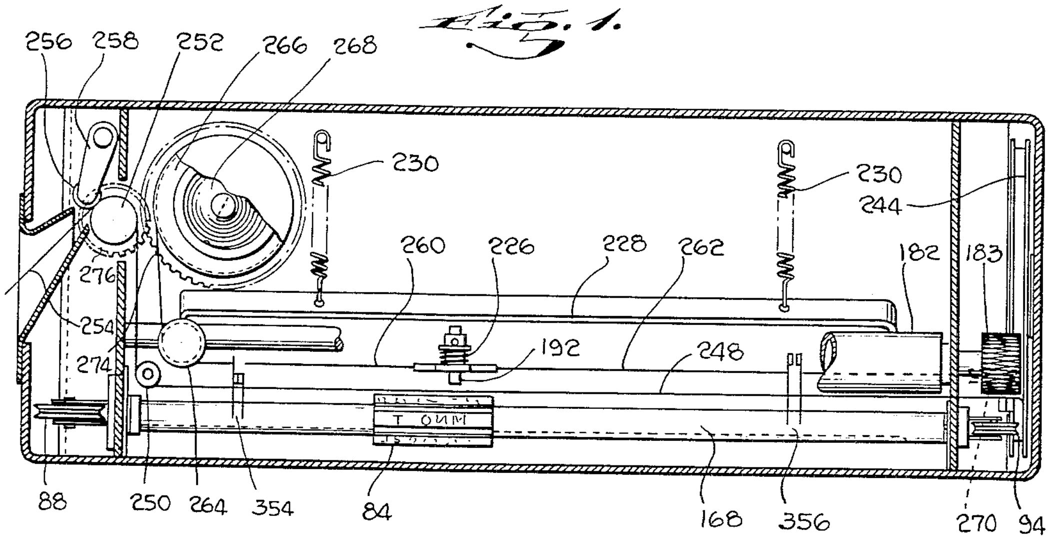
Fig. 1 is a horizontal section through a telegraph printer embodying features of my invention, and taken approximately in the plane of the line 1—1 of Fig. 4.

The preferred form of the invention is shown in Figs. 1 through 8 of the drawing. However, it is believed that the operation and construction of the invention will be more readily understood by first discussing the schematic diagrams in Figs. 10, 11 and 12 which show modifications but in elementary form.

Figures 7, 8, 9, 10, 11, 12:
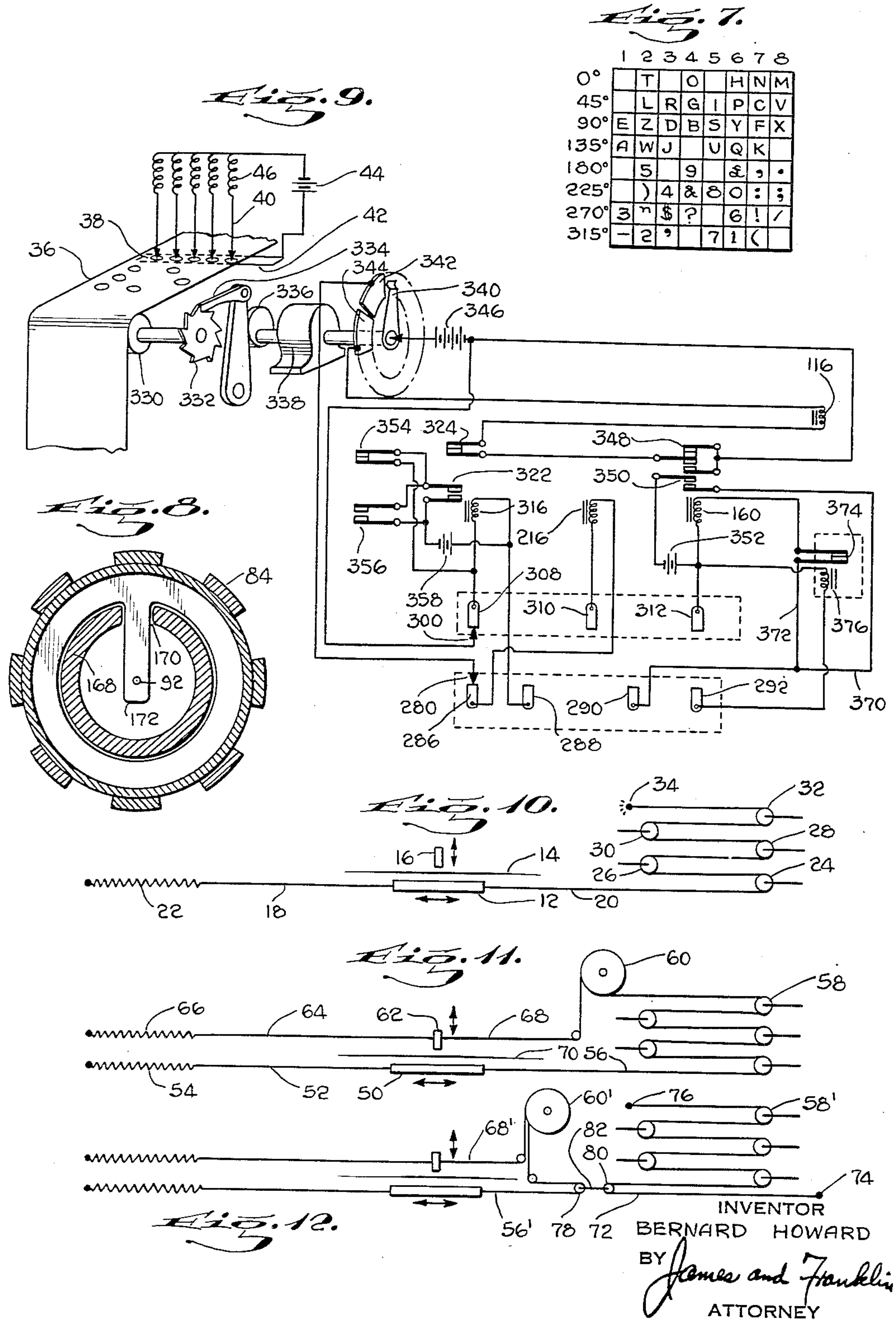
Fig. 7 is a development of the type cylinder.
Fig. 8 is a transverse section through a slotted shaft carrying the type body, drawn to greatly enlarged scale.
Fig. 9 is a schematic wiring diagram for the printer.
Fig. 10 is a simplified schematic diagram explanatory of a modification of the invention.
Fig. 11 is a simplified schematic diagram explanatory of a furter modification of the invention.
Fig. 12 is a simplified schematic diagram explanatory of still another modification of the invention.

Referring first to Fig. 10, the characters to be printed are disposed side by side on a type bar 12. The paper to be printed is shown at 14, and a selected letter is printed by operation of a hammer 16 which presses the paper 14 against one of the characters on bar 12. Inking is most conveniently taken care of by interposing a typewriter ribbon, not shown, between the type bar 12 and the paper 14.

To select the desired character to be printed, the bar 12 is rapidly shifted back and forth relative to the hammer 16. For this purpose it is moved by flexible strands 18 and 20, the strand 18 being connected to a return spring 22, and the strand 20 being trained in series about a plurality of pulleys 24, 26, 28, 30 and 32. The remote end of the strand is fixed at 34.

The flexible strand may be a wire, or a wire cable, or a cord made of twisted synthetic fibres of inelastic character, or it may be a chain. The chain may be a sprocket chain, but more preferably may be a universally flexible ball chain, and in the latter case the pulleys may be recessed about their periphery to mesh with the ball chain. A typical product of this character is that made by Voland Company of New Rochelle, New York. In the following specification I may, for convenience, employ the term "cable," but it should be understood that any flexible strand or connector of non-stretching character is intended when using the term "cable."

The pulleys are moved horizontally to either of two positions which may be called an "in" position, resulting in effective lengthening of the cable 20 and consequent movement of the type bar 12 to the left, and an "out" position, resulting in effective shortening of the cable 20 and consequent movement of the type bar 12 to the right. The motion of one pulley, say pulley 24, is accurately limited to an amount which moves the type bar one character. The cable change is double the pulley change, and therefore if the characters are spaced, say ⅛", the pulley motion of pulley 24 should be 1/16". In any event the predetermined motion of pulley 26 is double that of pulley 24, while that of pulley 28 is double that of pulley 26, and so on. Thus the pulley motions may be 1/16", ⅛", ¼", and so on. With five pulleys as shown, a selection of thirty-two characters may be provided. The type bar 12 is thirty-two characters in length.

Referring now to Fig. 9 of the drawing, the selected character is determined by perforations through a tape 36. There are five lines or levels of perforations, as shown at 38, and five contacts or sensing elements 40 are adapted to pass through the perforations and make contact with a bottom plate 42. The contacts 40 supply current from a suitable source, here indicated schematically by battery 44, to five different circuits controlling the five pulleys. In the specific form of the invention here illustrated the circuits energize solenoids which move cores connected to the pulleys, and in Fig. 9 the solenoid coils are indicated at 46. It will thus be seen that different combinations of pulley positions will be established, depending on the code distribution of the perforations in tape 36, thereby selecting any desired one of thirty-two type characters.

As so far described the paper 14 might be a tickertape moved longitudinally step by step to receive the successive characters, the hammer 16 (Fig. 10) remaining in one position at the printing point, except for its printing movement toward and from the paper. The paper 14 might also be a sheet of paper held between rollers, carried somewhat like a typewriter platen on a carriage, which is itself provided with a step by step carriage movement so that the successive letters will be printed one after another on a line across the paper. After finishing a line the upper roller is rotated a notch to raise the paper and the carriage is returned to starting position, thus beginning the printing of another line. However, for compactness it may be desired to move the hammer and type bar for the horizontal travel, and to use the rollers solely for vertical travel of the paper.

Such an arrangement is schematically illustrated in Fig. 11, referring to which it will be seen that the type bar 50 flies back and forth for character selection under control of cable 52, return spring 54, cable 56, and five selector pulleys collectively designated 58. However, the remote end of cable 56 is not secured at a fixed point as in Fig. 10, and instead is wound about a drum 60 which is operated step by step by a suitable pawl and ratchet mechanism, not shown. The hammer 62 also travels horizontally, it being controlled by a cable 64, return spring 66, and cable 68 the end of which is connected to another coaxial drum or a coaxially displaced part of the drum 60. Thus both cables 56 and 68 are shortened step by step to carry the printing operation horizontally across the face of the paper sheet 70.

On reflection it will be seen that the selector pulleys 58 will cause the type bar 50 to fly back and forth relative to the hammer 62, thereby selecting the proper characters to be printed, but that at the same time both the hammer and type bar travel bodily from left to right. The roller controlling the paper sheet 70 has no horizontal travel, but is turned step by step at long intervals for vertical travel of the paper when changing from one printed line to the next lower line.

Referring now to Fig. 12, the mechanism there is much the same as that shown in Fig. 11, except that the type selection has been separated (for a reason described later) from the horizontal travel, by the use of separate cables which are coupled together by pulleys. As before, a ratchet operated drum 60′ shortens cables 56′ and 68′ equally. The selector pulleys 58′ act on a special cable 72 which is fixedly anchored at both ends 74 and 76. The cable 72 is coupled to the cable 56′ by means of pulleys 78 and 80 rigidly connected together at 82, so that they are bodily shifted in unison to the right or left.

Figure 2:
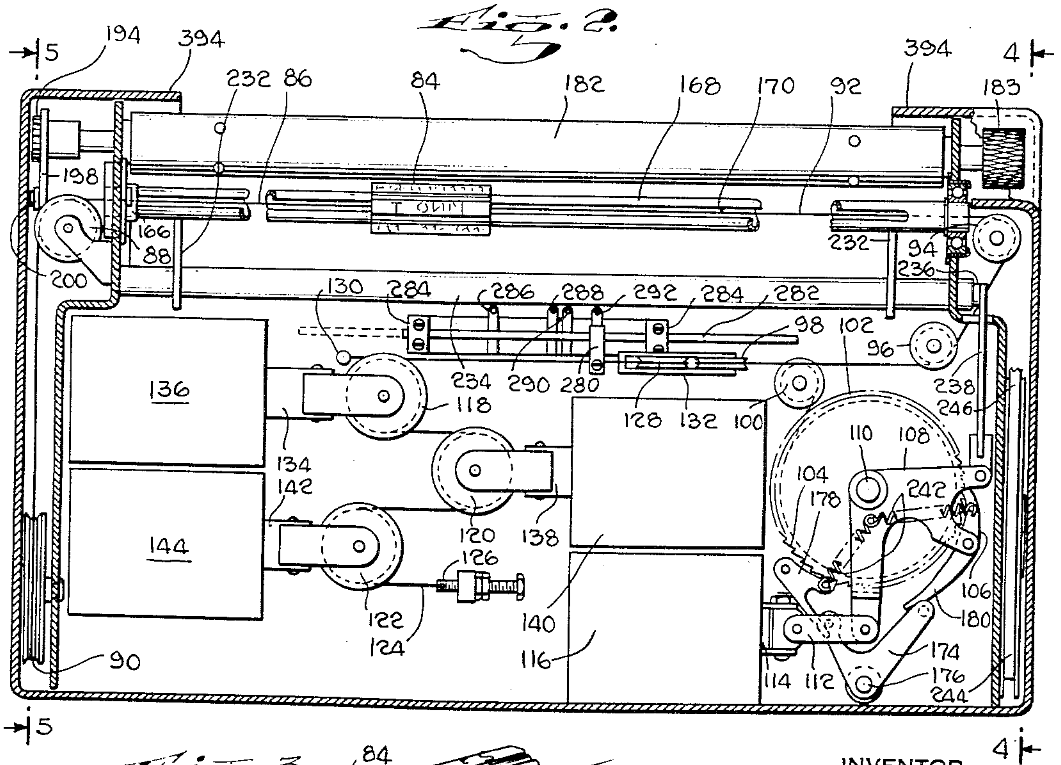
Fig. 2 is a section taken in elevation approximately in the plane of the line 2—2 of Fig. 4.
Figure 3:
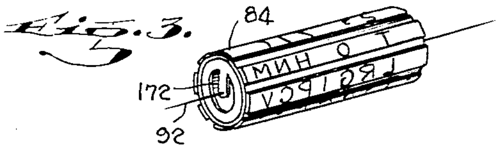
Fig. 3 is a perspective view showing how the type characters may be arranged in lines about a cylinder.

With the foregoing preliminary introduction in mind, attention is now directed to Figs. 1 through 6 of the drawing. In Fig. 3 it will be seen that the type characters are disposed about a cylinder. For type selection the cylinder is moved both axially and rotatively. In the present case the cylinder is eight characters long, and has eight lines of type, thus providing for sixty-four characters in all. This large number of characters would require excessive travel if the characters were all disposed along a type bar, or around a narrow type wheel, but by using a type cylinder, the maximum travel and consequent inertia in either direction is relatively limited.

Referring now to Fig. 2 of the drawing, the type body 84 is shifted axially by means of cables including a return cable 86 passing around a guide pulley 88 and leading to a spring-operated wheel or drum 90. The opposite cable 92 passes around guide pulleys 94 and 96 and thence around a coupling pulley 98. From coupling pulley 98 the cable leads back over a guide pulley 100 to a take-up drum 102 having ratchet teeth 104. These are acted on by a feed dog 106 carried by an angle lever 108 pivoted at 110 and operated by a link 112 and solenoid core 114 in response to energization of a solenoid coil 116. The resulting step by step shortening of the cable causes a horizontal travel of the type body 84 across the paper from left to right.

The type selection is obtained by means of selector pulleys 118, 120 and 122. A cable 124 is trained in series around these pulleys, and its lower end is fixedly anchored at an adjustment or tensioning screw 126. The upper end passes about a coupling pulley 128 and thence back to a stationary post or anchorage point 130. It will be understood that the coupling pulleys 98 and 128 are connected, as by means of a movable frame 132. Pulley 118 is moved by a solenoid core 134 and coil 136; pulley 120 is moved by a solenoid core 138 and coil 140; and pulley 122 is moved by a solenoid core 142 and coil 144. With three pulleys as shown, adjusted between "in" and "out" positions representing a travel of one unit, two units, and four units, it becomes possible to select any of the eight characters along the type body 84.

The rotary selection of type may be explained with reference to Fig. 6 of the drawing. The selector cable 146 is trained in series about selector pulleys 148, 150 and 152. The lower end of the cable is fixed at screw 154. Pulley 148 is moved to either of two positions by a solenoid 156, pulley 150 is moved to either of two positions by a solenoid 158; and pulley 152 is moved to either of two positions by a solenoid 160. The pulleys 162 and 164 are merely guide pulleys. The latter turns the upper end of the cable forward. Referring now to Fig. 2, the cable is trained about and secured to a drum 166. This in turn is secured to or forms a part of a tubular shaft 168 on which the type body 84 is slidably but non-rotatably carried. Thus rotation of the drum 166 and tube 168 causes a corresponding rotation of the type body 84.

Referring to Fig. 8 it may be explained that the hollow shaft or tube 168 is slotted as shown at 170, and that the cable 92 for axial selection is disposed on the axis of the tube 168. The type body 84 has connecting parts 172 which pass throughh the slot 170 to the cable 92. Thus the parts 172 act as splines or keys to insure rotation of the type body with the shaft, and at the same time act as means for connection to the cables (86 and 92 in Fig. 2) for axial selection and travel of the type body.

The horizontal travel of the type body 84 has already been described with reference to the drum 102 (Fig. 2), ratchet wheel 104, and pawl 106 actuated by solenoid 116. At the end of a line, and on receiving an appropriate signal, an angle lever 174 is turned counterclockwise about shaft 176, thereby disengaging a holding dog 178 from the ratchet teeth. At the same time it bears against the part 180 of the pawl 106, thereby disengaging the feed pawl from the ratchet teeth. This permits the tensioned spring in the restoring drum 90 to unwind the cable 92 from drum 102 and thereby to pull the type body 84 all the way back to the left or starting position. The control circuit for this function is described later.

Figure 4:
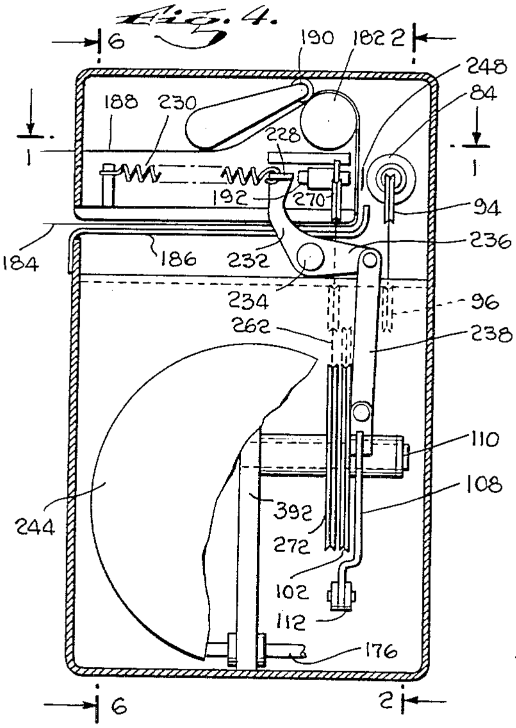
Fig. 4 is a vertical section taken approximately in the plane of the line 4—4 of Fig. 2.

The vertical travel of the sheet of paper is obtained by a step-by-step movement of a paper feed roller 182 shown in Fig. 4. The paper sheet enters the receptive open back of the cabinet as shown at 184, resting on a guide surface 186, and then turns upwardly to the roller 182. From the roller it is fed downward and rearward as shown at 188. A spring pressed roller 190 holds the paper against the roller 182. The printing hammer is indicated at 192, and the type body at 84. The forward end of the hammer may be made of moderately stiff rubber. The paper feed roller 182 may be turned manually by means of a knurled knob 183 (Figs. 1 and 2). The case is recessed to expose the knob.

Figure 5:
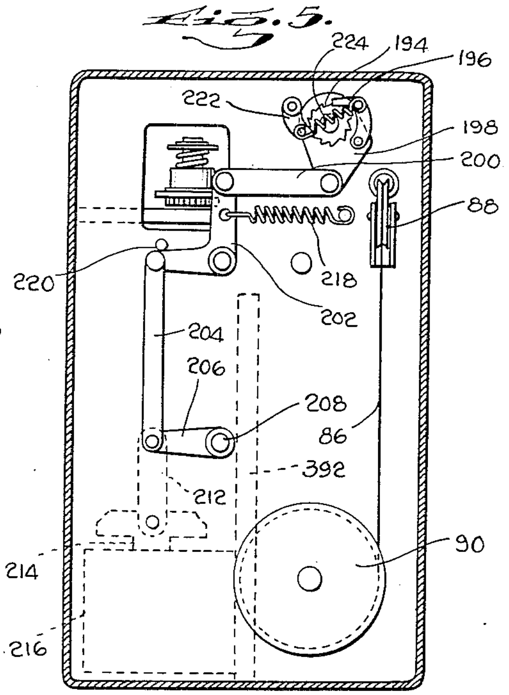
Fig. 5 is a vertical section taken approximately in the plane of the line 5—5 of Fig. 2.

Referring now to Fig. 5, the intermittent vertical feed of the paper is obtained by means of a ratchet wheel 194 secured to one end of the paper feed roller. Ratchet wheel 194 is acted on by a feed pawl 196 carried by an arm 198 moved by a link 200 connected to an angle lever 202 actuated by a link 204 connected to an arm 206 carried by a shaft 208.

Figures 6, 6A:
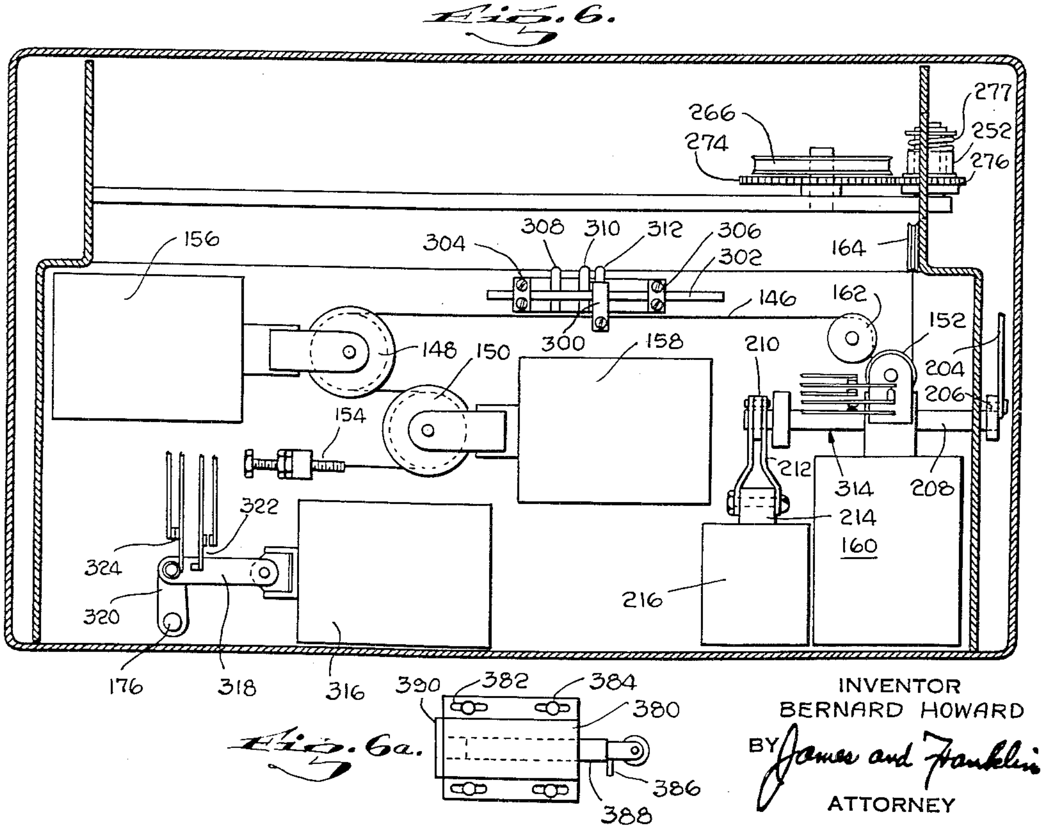
Fig. 6 is a section taken in elevation approximately in the plane of the line 6—6 of Fig. 4.
Fig. 6A is a detail showing one method of adjustment of pulley travel.

Referring now to Fig. 6 as well as Fig. 5, the inner end of shaft 208 carries an arm 210 actuated by a link 212 connected to a solenoid core 214 acted on by a solenoid coil 216. There is a return spring shown at 218 in Fig. 5, and a motion limiting stop 220. The return spring 218 causes the advance of the paper, and the solenoid 216 overcomes the resistance of the return spring and brings the feed pawl 196 back to bear against another tooth of the ratchet wheel. Return movement of the paper is prevented by a suitable holding dog 222, which is drawn toward the ratchet wheel by means of a pull spring 224 which extends between the feed pawl 196 and the holding pawl 222. The circuit for actuating the vertical travel or line advance solenoid 216 at intervals will be described later.

The hammer 192 (Fig. 1) is normally retracted by means of a small compressions pring 226. With the arrangement of Fig. 1 it will be seen that the lettering on the cylinder should be reversed or "mirror image." The hammer is advanced by means of a long hammer bar 228 which is long enough to cover all of the positions of the hammer as it moves from one side of the machine to the other. The said bar is normally retracted by means of two pull springs 230.

Referring now to Fig. 4, the hammer bar 228 is carried by arms 232 carried on a shaft 234. This is actuated by an arm 236 connected to a link 238, which in turn is connected to the angle lever 108, previously referred to in connection with Fig. 2.

Reverting now to Fig. 2, it will be seen how the spaced arms 232 are carried by a single long shaft 234, which in turn is operated by a horizontal arm 236 and an upright link 238. This in turn is pivotally connected to the angle lever 108, previously described as carrying the pawl 106. On reflection it will be seen that the hammer bar and hammer are actuated each time the pawl 106 is retracted downward preparatory to the next step of horizontal travel of the type body. In other words, the solenoid 116 acts to cause the printing operation as well as the step-by-step horizontal travel of the hammer and type body. The return springs 230 of the hammer bar 228 cause the horizontal travel. The springs 242 act merely to pull the feed pawl 106 and the check pawl 178 against the ratchet teeth 104.

The hammer 192 travels in unison with the type body 84. Referring to Fig. 1, the hammer is moved by cables 260 and 262. Cable 260 passes around a guide pulley 264 to a drum 266 carrying within itself a tension spring 268 which tends normally to shorten the cable 260. Cable 262 is led around a guide pulley 270 and thence downward. Referring now to Fig. 4, the cable 262 is led to and around a take-up drum 272. The latter is mounted on the same shaft 110 and turns in unison with the take-up drum 102 previously referred to as causing the step-by-step horizontal travel of the type body. It will thus be seen that the hammer is moved along in unison with the type body by the same pawl and ratchet and solenoid mechanism previously described, the solenoid being numbered 116 in Fig. 2.

Referring to Fig. 2, the ink ribbon is fed from a spool 244. It is led upward as shown at 246. Referring now to Fig. 1, the ink ribbon is then turned sideward, as by means of a conventional "turning bar," not shown, and fed horizontally edgewise as shown at 248, where it is disposed between the paper (not shown) and the type body 84. The ink ribbon is, of course, disposed at the height of the hammer 192, as indicated at 248 in Fig. 4. Reverting to Fig. 1, the ribbon is fed around guide pulley 250 and a feed wheel 252, and thence out of the machine at 254. It is held against feed wheel 252 by a pressure roller 256 carried at the free end of an arm 258.

During the printing of a line the ink ribbon 248 remains stationary. There is no need to move it because the hammer and type body are moving relative to the ribbon. However, at the end of a line, and preparatory to printing another line, the ribbon is moved an amount corresponding to the length of the previously printed line, thus presenting anew length of ribbon to the hammer and type body. This movement is here accomplished as a part of the hammer return travel.

Thus referring to Fig. 1, the return drum 266 of cable 260 carries a large diameter gear 274 meshing with a small diameter gear 276 connected to the ribbon feed wheel 252. The ratio of the diameters is so selected that the ribbon movement corresponds to the cable movement, which in turn corresponds to the length of the line previously printed.

The connection between the ribbon feed wheel 252 and its gear 276 is preferably through a unidirectional clutch, indicated at 277 in Fig. 6. Thus the ribbon position is not changed during normal step-by-step horizontal travel forward of the type cylinder and hammer, but the ribbon position is changed during the return travel.

It will be understood that instead of feeding the ribbon out of the machine, as shown at 254, it may be wound up on a take-up drum and then re-used by return movement in either direction several times, as is done with ordinary typewriter ribbons. Even with the mechanism here shown the ribbon may be re-used by rewinding the ribbon on the supply wheel 244 after it has been unwound therefrom.

It will be recalled that the axial selection of type character is obtained by three solenoids shown in Fig. 2 at 136, 140 and 144, and that the rotary selection is obtained by three solenoids shown in Fig. 6 at 156, 158 and 160. The first five of these six solenoids are controlled by the five-level perforations in the tape, and the operation of the sixth solenoid 160 is treated as a special function along with certain other special functions which are made possible by additional mechanism next described. Of course, the entire apparatus can be greatly simplified by using six series of perforations in the tape, but five-level perforation has already been standardized to considerable extent, and the present machine is accordingly adapted for use with a five-unit code. A less than five unit code might be used, but with fewer characters available at the printer.

Referring to Fig. 2, it will be seen that the type selector movement of cable 124 is accompanied by movement of a register means in the form of a brush or contactor 280. This is preferably carried on a guide rod 282 slidable through stationary bearings 284. There are four contacts 286, 288, 290 and 292 which may be engaged by the brush 280 when moved by the selector cable 124. It is primarily to isolate the selector positions in respect to the contacts 286—292, from the horizontal step by step travel of the type body, that the two independent cables 124 and 92 are used, separated as they are by the coupling pulleys 98, 128.

Referring now to Fig. 6, there is a similar arrangement in that the cable 146 moves a second register means in the form of a brush or contactor 300. This is physically carried by a guide rod 302 which is slidable in bearings 304 and 306. The brush 300 rides over and cooperates with stationary contacts 308, 310 and 312. It will be noted that the brush 300 is connected to cable 146 at a point located between the selector pulleys 148 and 150, on the one hand, and the pulley 152, which may for convenience be referred to as a "shift" pulley rather than a "selector" pulley. Thus the positions of the brush 300 depend on the selector pulleys 148 and 150, and are independent of the shift pulley 152.

Referring now to Fig. 7 of the drawing, I there show a development of one possible arrangement of type characters on the type drum. No attempt has been made to show them in "mirror image." The axial positions are indicated horizontally, and the rotative or angular positions are indicated vertically. It will be noted that the upper four lines correspond to a semi-cylinder of the drum containing the letters of the alphabet, while the lower four lines correspond to the opposite half of the drum and contain the numerals, punctuation, and special symbols, hereinafter referred to as "figures." The selector solenoids 136, 140 and 144 of Fig. 2 provide the horizontal selection along any one of the lines shown in Fig. 7. The selector solenoids 156 and 158 of Fig. 6 provide four angular positions corresponding to any of the four top lines, or a diametrically opposite one of the four bottom lines shown in Fig. 7. The solenoid 160 of Fig. 6 has the largest of the three different strokes of the three solenoids 156, 158 and 160, and its stroke is such as to turn the drum 180° and thus to shift the drum from one half to the other, or in the specific case here shown, from letters to figures, or vice versa.

It may be mentioned that the operation of the five selector solenoids is momentary. The return spring at the end of the cable acts as a return spring for each solenoid, which, when energized, is energized only momentarily when there is a perforation in the tape. On the other hand the shift solenoid 160 is provided with a bank of contacts, indicated at 314 in Fig. 6, which cause the solenoid to "stick," that is, it remains down when moved down, and it remains up when moved up, so that letters are selected and printed in sequence until there is a signal to shift to figures, and figures are selected and printed in sequence until there is a signal to shift to letters.

This shift is treated as one of the special functions in the machine, the signal for which depends on a predetermined register or combination of brush positions for the brushes 280 and 300 shown in Figs. 2 and 6. In Fig. 7 it will be observed that there are certain blank spaces, and these blank spaces correspond to the special functions, for the printing hammer is actuated at each step, but its actuation is without effect when it is opposite one of the blank spaces on the type cylinder.

Reverting now to Fig. 9 of the drawing, the printing solenoid which actuates the hammer and which causes step-by-step horizontal travel is indicated at 116. The line advance solenoid which causes vertical travel of the sheet of paper is indicated at 216. The shift solenoid is shown at 160. The carriage return solenoid is shown at 316, and referring to Fig. 6 it will be seen that this solenoid acts on a link 318 and an arm 320 carried by a shaft 176, and reverting to Fig. 2, it will be recalled that shaft 176 carries and moves an angle lever 174 to lift both the feed pawl and the check pawl from the horizontal feed ratchet wheel 104, thus permitting spring return of the type cylinder and the hammer to start a new line. The type cylinder is pulled back by spring drum 90 (Fig. 2) and the hammer is pulled back by spring drum 266 (Fig. 1).

Reverting now to Fig. 9 of the drawing, the bank of five solenoids 46 correspond to the five selector solenoids and do not include the sixth or shift solenoid 160. The tape 36 is advanced step-by-step by means of a tape feed roller 330 driven by a ratchet wheel 332, operated by a pawl 334, reciprocated by a cam 336, driven by a motor 338 which determines the speed of operation of the printer. The motor also drives a distributor arm 340 which engages a pair of segments 342 and 344. When segment 344 is engaged, energy from a suitable source, here indicated as battery 346, is supplied to the printing solenoid 116 through normally closed contacts 324 of solenoid 316 and contacts 348 of solenoid 160.

The use of separate segments 342 and 344 insures that the printing step or operation of the hammer will follow the type selection or special function. Moreover, the horizontal travel step of the hammer and of the type cylinder takes place on the return movement of solenoid 116, and this insures that it will take place after operation of the hammer, the arrangement being such that there is no possibility of attempting to feed the hammer and type cylinder along the paper while the hammer is against the paper. Of course, the angular relation between the cam 336 and the distributor arm 340 and the shape of the cam are such that there is time for the type selection to take place before the printing step, and it may be explained that the perforations in the tape way dwell long enough in one position to afford these successive operations while the contacts 40 are still making contact through the perforations.

When the distributor arm 340 is on the segment 342 a special function may take place if the code perforations in the tape happen to call for the performance of one of said special functions. Such special functions include carriage return, line feed or vertical paper feed, and shift between letters and figures.

The four brush-operated contacts 286—292 described in connection with Fig. 2 are shown at the bottom of Fig. 9 and are similarly numbered, the brush being indicated at 280. The three brush-operated contacts 308—312 shown in Fig. 6 are similarly numbered in Fig. 9, and are contacted by brush 300. Actually the combination of four contacts on one selector and three contacts on the other selector makes available twelve special functions, and it will be noted in the development of the type cylinder in Fig. 7 that in this particular case there are thirteen blank spaces, which are fully adequate to take care of the special functions.

It may be explained that most of the special functions preferably are taken care of in duplicate positions. For example, carriage return will be signalled whether the printing cylinder is printing letters or printing figures, without necessitating a shift from one to the other. Similarly, line feed will be taken care of whether the characters being printed at the end of the line are letters or figures, without necessitating a special shift from one to the other. So also the provision of a space between successive characters may be a space between letters, or a space between figures, without necessitating a shift from one to the other. Similarly, there is needed while printing letters, a signal to shift to figures, and while printing figures, a signal to shift to letters, so that duplicate spaces are provided for this shift function. In addition it is customary in codes to provide for a "blank" in contradistinction to a "space," the distinction being that a special signal is transmitted for "space," while "blank" corresponds to the complete absence of signal, or, in other words, unperforated tape when using a tape as here shown.

A shift of the type cylinder between letters and figures requires energization or de-energization of the solenoid 160. With the brush 300 on contact 312 and the brush 280 on contact 290 a circuit is established through the solenoid 160. Actuation of the solenoid incidentally closes the contacts 350, and this keeps the solenoid energized because of a circuit from source 362 through contacts 350, conductor 370, conductor 372, relay contacts 374, to solenoid coil 160. This will cause a sustained or maintained printing of figures.

When the brush 300 is on contact 312 and the brush 280 is on contact 292 there is a shift to the printing of letters. This is caused by energization of the relay coil 376 which then opens the contacts 374, thereby de-energizing the solenoid 160, and so causing a shift of the printing cylinder to cause maintained printing of letters. This also causes opening of contacts 350, and the solenoid 160 remains de-energized.

When the brush 280 is on contact 286 and the brush 300 is on contact 310 energy is supplied to the line feed solenoid 216, thereupon advancing the paper vertically for the printing of another line. This requires only momentary energization.

When the brush 280 is on the contact 288 and the brush 300 is on the contact 308 the carriage return solenoid 316 is energized. This releases the check and feed pawls and permits the spring drums to pull the type cylinder and the hammer back to starting position. It will be noted in Fig. 6 that there are normally open contacts 322 and normally closed contacts 324 associated with the carriage return solenoid 316. When the solenoid is energized the normally open contacts 322 are closed, and the normally closed contacts 324 are opened.

The opening of contacts 324 opens the circuit through the printing solenoid 116 and makes it impossible to actuate the printing hammer. Thus there is no danger of attempting to return the hammer and type body back to starting position while bearing against the paper.

The operation of the printing hammer is similarly disabled during shift from letters to figures or back again. For this purpose reference may be made to the top and bottom contacts 348 which are arranged in shunt with one another. One or the other are normally closed. When solenoid 160 is de-energized the top contacts are closed. When solenoid 160 is energized the bottom contacts are closed. However, there is lost motion between the contacts such that the circuit through the contacts is open during the transition period, that is, during the change from the letter half of the cylinder to the figure half of the cylinder, or vice versa. This is a safeguard against any possibility of shifting of the cylinder during actuation of the printing hammer.

Referring to Fig. 1 of the drawing, there are normally closed contacts 354 near one end of the hammer travel, and normally open contacts 356 near the other end. These are limit contacts to limit the maximum length of a line of type in case no signal is received from the perforated tape to terminate the said line. When the hammer reaches and closes the contacts 356 further travel is prevented, and there is a carriage return movement which is itself terminated when the hammer moving back opens the normally closed contacts 354. These contacts are shown in Fig. 9, and it will be seen that closing of the normally open contacts 356 energizes the carriage return solenoid 316 from the power source 358, the said circuit then running through the normally closed contacts 354. When the hammer has been returned it opens the contacts 354, thereby opening the local circuit from source 358 and again de-energizing the carriage return solenoid 316. During the carriage return movement the energized solenoid 316 opens the normally closed contacts 324, and this prevents operation of the printing solenoid 116.

The carriage return solenoid 316 is arranged to act as a "stick" or holding solenoid. It is usually energized through the brush contacts 308 and 288 as a special function, because normally the end of the line is indicated by signal from the transmitter. When it is energized the contacts 322 close, thus closing a holding circuit from power source 358, it being recalled that the contacts 354 are normally closed. Thus the solenoid remains energized for sufficient time for the type body and hammer to move all the way back to starting position, at which time the normally closed contacts 354 are opened, thereby de-energizing solenoid 316 and permitting resumption of normal step-by-step horizontal travel in forward direction.

If the end of the line is indicated by engagement and closing of the normally open limit contacts 356, they close the local circuit from power source 358, and so energize the solenoid 316 which, when energized, closes the holding contacts 322 so that the solenoid remains energized until full return of the type body and hammer which opens the contacts 354 and so de-energizes the solenoid.

To summarize the action of the brush contacts indicated at the bottom of Fig. 9, a circuit between contacts 310 and 286 corresponds to line feed or vertical movement of the paper. A circuit through contacts 308 and 288 causes carriage return. A circuit between contacts 312 and 290 causes a shift to the printing of figures, while a circuit between contacts 312 and 292 causes a shift to the printing of letters. These four functions correspond to eight functions, because each will work in duplicate positions. It should be kept in mind with reference to Fig. 6 that the separation of the shift solenoid 160 from the selector solenoids 156 and 158, with the brush contact 300 secured to the cable 146 therebetween, means that a single brush contact position will correspond to either figures or letters.

With reference to Fig. 2, the separation of the selector cable 124 from the horizontal travel cable 92, by means of the coupling pulleys 98 and 128, makes it possible for the position of the brush 280 to depend solely on the selector position of the cable 124, and to be independent of the horizontal travel position of the cable 92.

It will be recalled that the pulley motion of the selector solenoids varies. For example, in Fig. 2 the motion of pulleys 118, 120, 122 may be ¼", ⅛", 1/16" respectively. The adjustment and limitation of this motion may be accomplished in many ways, a preferred one of which is illustrated in Fig. 6A of the drawing. The solenoid coil 380 has a base with four slots 382 and is mounted by means of four screws 384 passing through the slots. A stationary stop 386 limits the outward movement of the solenoid core 388. The inward movement is limited by a structure of the solenoid itself, for example, the end 390. It will be evident that with this arrangement the stops such as 386 for all of the solenoids may be permanently fixed in position, and that the travel of the particular pulley may be regulated by simply bodily shifting the solenoid coil, and then tightening the mounting screws 384 to lock the coil in position.

Referring to Figs. 4 and 5 of the drawing, it will be seen that there is a vertical partition plate 392 disposed about halfway between the front and back of the casing. Most of the selector mechanism and the parts shown in Fig. 2 are mounted on the forward side of this plate 392. The selector mechanism and other parts shown in Fig. 6 are mounted on the rear side of the plate. The shaft 176 shown in Figs. 2 and 6 passes through the mounting wall 392, as shown near the bottom of Fig. 4. The wall 392 stops short of the ends of the outside case in order to provide room for relatively large diameter wheels such as the ribbon drum 244 shown in Figs. 1 and 4. Most of the top wall of the casing is cut away, as indicated at 394 in Fig. 2, and the adjacent upper portions of the front and rear walls are cut away, thereby facilitating the placing or threading of a sheet or web of paper into the machine, as previously described in connection with Fig. 4.

It is believed that the construction and operation of my improved printer for operation in response to code signals, as well as the advantages thereof, will be apparent from the foregoing detailed description. It will also be apparent that while I have shown and described the invention in a preferred form, changes may be made in the structure shown without departing from the scope of the invention, as sought to be defined in the following claims.

I claim:

1. In a telegraph printer, a cylindrical type body having lines of characters about the surface thereof, a first cable connected to the type body for moving the same axially, a first set of pulleys about which the cable is trained in series, a second cable for rotating the type body, a second set of pulleys about which the second cable is trained in series, means to move each of said pulleys to either of two positions in a direction to effectively shorten or lengthen the cable, the effective cable change produced by one of said means and pulleys in each set being double that produced by another in said set, electrical circuits controlling said means in appropriate combinations to select the desired character to be printed, register means movable with the first cable to help initiate a special function, register means movable with the second cable to help initiate a special function, and means effective only in the event of a desired registered relation between said first and second register means and corresponding to a blank position on said printing cylinder for initiating a special function such as paper feed, carriage return, or a shift between letters and figures.

2. In a telegraph printer, a type body having a plurality of characters to be printed, a cable connected to the type body for moving the same to select a character to be printed, a platen which is immovable axially to support the paper, a pawl and ratchet mechanism to move the type body step by step across the paper independently of the character selecting movement of the type body, the aforesaid cable being divided into two parts, one of which is used for character selection and the second of which is used for step by step feed, and the said two cable parts being coupled by means of a pulley, said first cable part being operatively connected to said pulley, said second cable part being trained around the pulley, and being connected at one end to the type body, and being connected at the other end to the pawl and ratchet mechanism which takes up the cable step by step.

3. In a telegraph printer, a type body having a plurality of characters to be printed, an ink ribbon and paper disposed adjacent the type body, a hammer to bring together the paper and ribbon and a character of the type body, a cable connected to the type body for moving the same relative to the hammer and paper to select the character to be printed, a platen which is immovable axially to support the paper, a pawl and ratchet mechanism to move the type body step by step across the paper independently of the character selecting movement of the type body, and means to move the hammer step by step across the paper in synchronism with the step by step movement of the type body, the aforesaid cable being divided into two parts, one of which is used for character selection and the second of which is used for step by step feed, and the said two cable parts being coupled by means of a pulley, said first cable part being operatively connected to said pulley, said second cable part being trained around the pulley, and being connected at one end to the type body, and being connected at the other end to the pawl and ratchet mechanism which takes up the cable step by step.

4. In a telegraph printer, a type body having a plurality of characters to be printed, an ink ribbon and paper disposed adjacent the type body, a hammer to bring together the paper and ribbon and a character of the type body, a cable connected to the type body for moving the same relative to the hammer and paper to select the character to be printed, a plurality of pulleys about which the cable is trained in series, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, a platen which is immovable axially to support the paper, a pawl and ratchet mechanism to move the type body step by step across the paper independently of the character selecting movement of the type body, and means to move the hammer step by step across the paper in synchronism with the step by step movement of the type body, the aforesaid cable being divided into two parts, one of which is used for character selection and the second of which is used for step by step feed, and the said two cable parts being coupled by means of an additional pulley, said first cable part being operatively connected to said additional pulley in addition to being trained around the selector pulleys, the second cable part being trained around said additional pulley, and being connected at one end to the type body, and being connected at the other end to the pawl and ratchet mechanism which takes up the cable step by step.

5. In a telegraph printer, a type body having a plurality of characters to be printed, an ink ribbon and paper disposed adjacent the type body, a hammer to bring together the paper and ribbon and a character of the type body, a cable connected to the type body for moving the same relative to the hammer and paper to select the character to be printed, a plurality of pulleys about which the cable is trained in series, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, a platen which is immovable axially to support the paper, a pawl and ratchet mechanism to move the type body step by step across the paper independently of the character selecting movement of the type body, and means to move the hammer step by step across the paper in synchronism with the step by step movement of the type body, the aforesaid cable being divided into two parts, one of which is used for character selection and the second of which is used for step by step feed, and the said two cable parts being coupled by means of an additional pulley, said first cable part being operatively connected to said additional pulley in addition to being trained around the selector pulleys, the second cable part being trained around said additional pulley, and being connected at one end to the type body, and being connected at the other end to the pawl and ratchet mechanism which takes up the cable step by step, and the hammer being moved by a third cable which also is connected to the aforesaid pawl and ratchet mechanism so that it is taken up step by step in unison with the second cable part.

6. In a telegraph printer, a type body having a plurality of characters to be printed, a cable connected to the type body for moving the same relative to the hammer and paper to select the character to be printed, a plurality of pulleys about which the cable is trained in series, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, a platen which is immovable axially to support the paper, a pawl and ratchet mechanism to move the type body step by step across the paper independently of the character selecting movement of the type body, the aforesaid cable being divided into two parts, one of which is used for character selection and the second of which is used for step by step feed, and the said two cable parts being coupled by means of an additional pulley, said first cable part being operatively connected to said additional pulley in addition to being trained around the selector pulleys, the second cable part being trained around said additional pulley, and being connected at one end to the type body, and being connected at the other end to the pawl and ratchet mechanism which takes up the cable step by step, and control means for special functions, said control means being connected to and moved by the character selection cable part, and being unaffected by the step by step feed cable part.

7. In a telegraph printer, a type body having a plurality of characters to be printed, the type body being cylindrical with eight lines of characters about the surface thereof, a first set of pulleys, a first cable connected to the type body for moving the same axially to help select the character to be printed when acted on by said first set of pulleys about which the cable is trained in series, a second set of pulleys, a second cable to rotate the type body when acted on by said second set of pulleys, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, the type cylinder being eight characters long in axial direction and the first cable being acted on by three movable pulleys to select any desired one of the eight positions in axial direction, the second cable also being acted on by three pulleys, whereby sixty-four type spaces are made available, the aforesaid first cable being divided into two parts one of which is used for character selection and an additional pair of connected pulleys, the second of which is used for step by step feed, and the said two cable parts being coupled by means of an additional pulley, said first cable part being operatively connected to said additional pulley in addition to being trained around the selector pulleys, the second cable part being trained around said additional pulley, and being connected at one end to the type body and being connected at the other end to a pawl and ratchet mechanism which takes up the cable step by step.

8. In a telegraph printer, a type body having a plurality of characters to be printed, the type body being cylindrical with eight lines of characters about the surface thereof, a first set of pulleys, a first cable connected to the type body for moving the same axially to help select the character to be printed when acted on by said first set of pulleys about which the cable is trained in series, a second set of pulleys, a second cable to rotate the type body when acted on by said second set of pulleys, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, the type cylinder being eight characters long in axial direction and the first cable being acted on by three movable pulleys to select any desired one of the eight positions in axial direction, the circumference being divided into two halves each having four lines of characters, the second cable being acted on by three pulleys, the means for operating two of the pulleys operating momentarily to select a desired one of the four rotative positions in either half of the cylinder, while the means for operating the third pulley remains fixed in either extreme position to select either half of the cylinder, whereby sixty-four type spaces divisible into two main groups are made available.

9. In a telegraph printer, a type body having a plurality of characters to be printed, the type body being cylindrical with eight lines of characters about the surface thereof, a first set of pulleys, a first cable connected to the type body for moving the same axially to help select the character to be printed when acted on by said first set of pulleys about which the cable is trained in series, a second set of pulleys, a second cable to rotate the type body when acted on by said second set of pulleys, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, the type cylinder being eight characters long in axial direction and the first cable being acted on by three movable pulleys to select any desired one of the eight positions in axial direction, the circumference being divided into two halves each having four lines of characters, the second cable being acted on by three pulleys, the means for operating two of the pulleys operating momentarily to select a desired one of the four rotative positions in either half of the cylinder, while the means for operating the third pulley remains fixed in either extreme position to select either half of the cylinder, whereby sixty-four type spaces divisible into two main groups are made available, and control means for special functions such as paper feed or carriage return, said control means being connected to and being moved by the second cable at a point between the second and third pulley about which the cable is trained.

10. In a telegraph printer, a type body having a plurality of characters to be printed, the type body being cylindrical with eight lines of characters about the surface thereof, a first set of pulleys, a first cable connected to the type body for moving the same axially to help select the character to be printed when acted on by said first set of pulleys about which the cable is trained in series, a second set of pulleys, a second cable to rotate the type body when acted on by said second set of pulleys, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, the type cylinder being eight characters long in axial direction and the first cable being acted on by three movable pulleys to select any desired one of the eight positions in axial direction, the circumference being divided into two halves each having four lines of characters, the second cable being acted on by three pulleys, the means for operating two of the pulleys operating momentarily to select a desired one of the four rotative positions in either half of the cylinder, while the means for operating the third pulley remains fixed in either extreme position to select either half of the cylinder, whereby sixty-four type spaces divisible into two main groups are made available, the aforesaid first cable being divided into two parts one of which is used for character selection and the second of which is used for step by step feed, and the said two cable parts being coupled by means of an additional pulley, said first cable part being operatively connected to said additional pulley in addition to being trained around the selector pulleys, the second cable part being trained around said additional pulley, and being connected at one end to the type body and being connected at the other end to a pawl and ratchet mechanism which takes up the cable step by step.

11. In a telegraph printer, a type body having a plurality of characters to be printed, the type body being cylindrical with eight lines of characters about the surface thereof, a first set of pulleys, a first cable connected to the type body for moving the same axially to help select the character to be printed when acted on by said first set of pulleys about which the cable is trained in series, a second set of pulleys, a second cable to rotate the type body when acted on by said second set of pulleys, means to move each of said pulleys to either of two positions in a direction to effectively shorten or lengthen the cable, the effective cable change produced by one of said means and pulley being double that produced by another, and the motion produced by a third being double that produced by the second, and electrical circuits to control the operation of said means in appropriate combinations to select the desired character to be printed, the type cylinder being eight characters long in axial direction and the first cable being acted on by three movable pulleys to select any desired one of the eight positions in axial direction, the circumference being divided into two halves each having four lines of characters, the second cable being acted on by three pulleys, the means for operating two of the pulleys operating momentarily to select a desired one of the four rotative positions in either half of the cylinder, while the means for operating the third pulley remains fixed in either extreme position to select either half of the cylinder, whereby sixty-four type spaces divisible into two main groups are made available, register means for special functions, said register means being connected to and moved by the second cable at a point between the second and third pulleys about which the cable is trained, the aforesaid first cable being divided into two parts one of which is used for character selection and the second of which is used for step by step feed, and the said two cable parts being coupled by means of an additional pulley, said first cable part being operatively connected to said additional pulley in addition to being trained around the selector pulleys, the second cable part being trained around said additional pulley, and being connected at one end to the type body and being connected at the other end to a pawl and ratchet mechanism which takes up the cable step by step, and register means cooperating with the aforesaid register means for special functions and connected to and moved by the character selection part of said first cable and being unaffected by the step by step feed part of said cable.

12. In a telegraph printer, a type body having a plurality of characters to be printed, the type body being cylindrical with lines of characters about the surface thereof, the type cylinder being carried by and being slidable along a rigid longitudinally slotted tube which is immovable axially but rotatable, and the type body being rotatable with the tube, an ink ribbon and paper disposed adjacent the type body, a hammer to strike the paper and ribbon toward a character of the type body, a first set of pulleys, a first cable passing axially through the tube and being connected to the type body through the slot for moving it axially relative to the hammer and paper to help select the character to be printed when acted on by said first set of pulleys about which the cable is trained in series, a second set of pulleys, a second cable wound about a drum carried by said tube in order to rotate the type body when acted on by said second set of pulleys, means to move each of said pulleys to either of two positions in a direction to effectively shorten or lengthen the cable, the effective cable change produced by one of said means and pulley being double that produced by another, and the motion produced by a third being double that produced by the second, in each set of pulleys, and electrical circuits to control the operation of said means in appropriate combinations to select the desired character to be printed.

13. In a telegraph printer, a type body having a plurality of characters to be printed, the type body being cylindrical with lines of characters about the surface thereof, the type cylinder being carried by and being slidable along a rigid longitudinally slotted tube which is immovable axially but rotatable, and the type body being rotatable with the tube, a first set of pulleys, a first cable passing axially through the tube and being connected to the type body through the slot for moving it axially to help select the character to be printed when acted on by said first set of pulleys about which the cable is trained in series, a second set of pulleys, a second cable wound about a drum carried by said tube in order to rotate the type body when acted on by said second set of pulleys.

References Cited in the file of this patent

UNITED STATES PATENTS

| | | |
|---|---|---|
| 723,567 | White | Mar. 24, 1903 |
| 1,139,972 | Henschel et al. | May 18, 1915 |
| 1,881,757 | Long et al. | Oct. 11, 1932 |

FOREIGN PATENTS

| | | |
|---|---|---|
| 58,018 | Netherlands | Jan. 15, 1946 |